Feb. 28, 1956  L. CRANBERG  2,736,802
PULSE HEIGHT ANALYZER SYSTEM
Filed Dec. 7, 1954
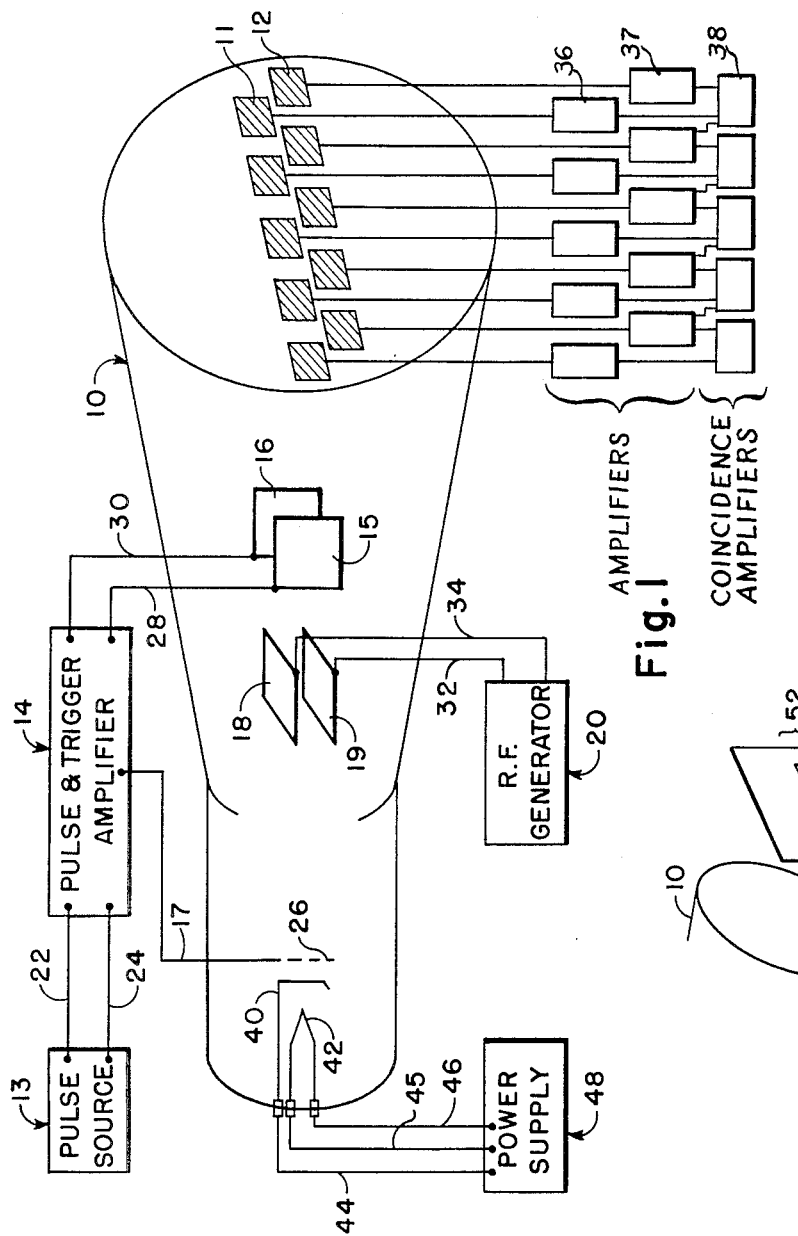
INVENTOR.
Lawrence Cranberg
BY

United States Patent Office 2,736,802
Patented Feb. 28, 1956

2,736,802
PULSE HEIGHT ANALYZER SYSTEM

Lawrence Cranberg, Los Alamos, N. Mex., assignor to the United States of America as represented by the United States Atomic Energy Commission Application December 7, 1954, Serial No. 473,765

3 Claims. (Cl. 250—27)

This invention relates to a method and apparatus for analyzing voltage pulses and more particularly to an apparatus for the measurement of the energy spectra of varying types of nuclear radiation.

Pulse analyzers have been developed employing intricate circuits employing a plurality of tubes. Such devices are in general unable to handle large counting rates when utilized in analyzers with a large number of channels. Other disadvantages with such pulse analyzers are their inability to count pulses having a short duration and their sluggishness of operation. The present invention uses an electron gun arrangement similar to that of a cathode ray tube for producing an electron beam, the deflection of which is controlled by the input voltage pulses. The pulse height selecting circuit is simple and free from errors due to tube characteristics, and provides a simple and rapid method of determining the number of voltage pulses occurring between two predetermined amplitudes.

The analyzer system of this invention is an improvement over the prior art device described in U. S. Patent 2,560,166, entitled Pulse Analyzer, issued to W. E. Glenn, Jr., which employs a plurality of anodes positioned across a cathode ray tube face.

It is an object of the present invention to produce an improved pulse analyzer.

Another object of the invention is to produce a pulse analyzer wherein an increased number of channels are obtained for a given number of anodes.

A further object of the present invention is to produce an improved pulse analyzer characterized by its simplicity, accuracy, and lack of channel overlap and underlap.

Other objects and advantages will be apparent in the following description considered together with the accompanying drawing in which the present invention is shown in schematic form, and wherein:

Figure 1 is a schematic drawing of one form of the pulse height analyzer of the invention, and Figure 2 is an exploded view of a modification showing the use of photocells and a co-operating mask.

Considering Figure 1 in detail, a pulse analyzer tube 10 is similar to a conventional cathode ray tube having a filament, a cathode, a grid, horizontal and vertical deflection plates, and an evacuated envelope. Disposed on the face of pulse analyzer tube 10 are a plurality of anodes 11 and 12 arranged in checker board relation. The plurality of the anodes 11 are arranged to provide a gap between each anode equal to approximately one-third their width. The plurality of anodes 12 are similarly spaced from one another and are staggered beneath the anodes 11 and arranged so that each anode is in an overlapping position with respect to two of the anodes 11 except the end anodes.

An electron gun arrangement is disposed axially at the opposite end of the analyzer tube 10 and comprises a heater filament 42, a cathode 40, a grid 26, a pair of vertical deflecting plates 18 and 19, and a pair of horizontal deflecting plates 15 and 16. For providing operating voltages to the heater filament 42 and the cathode 40, a power supply 48 is provided. The heater filament 42 is connected to the power supply 48 by wires 45 and 46. The cathode 40 and the power supply are connected by means of an electrical conductor 44.

A pulse source 13, which may be an ionization chamber, is electrically connected by two wires 22 and 24 to the input terminals of a pulse and trigger amplifier 14. The grid 26 of the pulse analyzer tube 10 is connected to the amplifier 14 by means of an electrical conductor 17. The horizontal deflection plates 15 and 16 are electrically coupled to the output of the amplifier 14 by means of suitable electrical conductors 28 and 30.

The vertical deflection plates 18 and 19 of the pulse analyzer tube 10 are connected by two wires 32 and 34 to a source of high frequency electrical energy 20.

Each anode of the plurality of anodes 11 is connected to the input of one of a group of electronic amplifiers 36. Similarly, each anode of the plurality of anodes 12 is connected to the input of one of a group of electronic amplifiers 37. The output of the amplifiers 36 is fed to a coincidence-non-coincidence amplifier of the group designated as 38. Likewise, the output of each amplifier 37 which is adjacent to the amplifier 36 is fed to the two adjacent coincidence-non-coincidence amplifiers 38. In the illustrated embodiment there is shown one coincident-non-coincident amplifier 38 for each pair of overlapping anodes. The output of the amplifiers 38 is fed to a suitable registering means not shown.

In operation, the pulses to be measured emanate from the pulse source 13 and are impressed on the pulse and trigger amplifier 14. These amplified pulses are applied to the deflection plates 15 and 16, and at the same time, a trigger pulse is applied to the grid 26 to turn on the electronic beam during the maximum of the pulse.

A high frequency signal is applied to the vertical deflection plates 18 and 19 forming a radio-frequency generator 20 to cause the pulse that is applied to the horizontal deflection plates 15 and 16 to sweep the height of the plurality of anodes 11 and 12. The current provided by the electron beam striking the anodes 11 and 12 is fed through electrical conductor lines to their respective amplifiers for amplifying the current produced therein. The resultant output of the amplifiers 36 and 37 is fed to its respective coincidence-non-coincidence amplifier 38, which is connected between the two amplifiers 36 and 37. These two amplifiers are connected to the oscilloscope anodes which overlap one another. The coincidence amplifier 38 provides a measurement of the pulse height if the electron beam should strike a position where the two oscilloscope anodes 11 and 12 overlap one another and the non-coincidence circuit is responsive to the position of the electron beam where there is no overlap.

The combination of overlapping anodes and coincidence-non-coincidence amplifiers prevents any gaps between anodes where a pulse might strike and not be recorded and any double counting in adjacent channels.

Figure 2 shows another embodiment of the invention wherein a mask 50 is placed between the face of the conventional cathode ray tube 10 and the photocell array 51. The photocells 51 are connected to amplifiers 36 and 37 and coincident-non-coincident amplifiers 38 in the same manner as shown in Figure 1. The mask 50 is provided with a plurality of apertures 52 which are disposed in checker board arrangement. The apertures 52 of each row are spaced apart by one-third their width, and are in staggered relation with the apertures below, for example. In this manner, the mask 50 with its apertures 52 eliminates the requirement that the photocells be disposed in the precise arrangement described, thereby adding versatility to the invention without impairing the characteristics of the present invention.

For convenience of description, only ten detectors are shown and described in the figures, but the anodes or apertures can be much smaller and many more such anodes or apertures can be inserted across the face of the tube, thus providing at least three or more times the number of detectors shown on the accompanying drawing.

By arranging the detecting means in the offset manner described, more channels may be obtained for a given number of detectors than is possible in the prior art. In particular, for the arrangements shown in the figures, the number of channels is $2n-1$, where $n$ is the number of detectors.

What is claimed is:

1. A pulse height amplitude analyzer for measuring various voltage amplitudes comprising a substantially conical evacuated glass tube, an electron gun having a cathode, filament, and control electrode positioned in a hollow cylindrical extension of the converging end of said cone, a plurality of anodes positioned across the face of said tube in two rows, said anodes positioned apart by one-third their width, a second row of anodes arranged below the first row of anodes but offset therefrom so that the anodes of the second row overlap by one-third the width of the anodes in said first row, a pair of horizontal deflecting plates positioned symmetrically about the axis of the tube in the converging portion thereof, a pair of vertical deflecting plates positioned symmetrically about the axis of the tube, a trigger and pulse amplifier for receiving and amplifying voltage pulses to be measured and connected to said horizontal deflecting plates, said trigger amplifier also connected to said control electrode for turning on an electron beam when the maximum of a voltage pulse is applied to said horizontal deflecting plates, high frequency generator connected to said vertical deflecting plates for deflecting said voltage pulses across the first and second rows of anodes, a plurality of amplifiers having their respective inputs connected to each of said anodes for amplifying a current change when the electron beam strikes said anode, a plurality of coincidence amplifiers connected between overlapping anode amplifiers for measuring said voltage pulse when said voltage pulse strikes the overlapping portions of said anodes in the first and second row of anodes.

2. A pulse height amplitude analyzer for measuring various voltage amplitudes comprising a substantially conical evacuated glass tube, an electron gun having a cathode, filament, and control electrode positioned in a hollow cylindrical extension of the converging end of said cone, a plurality of photo-electric cells positioned across the face of said tube, a mask disposed between the face of said tube and said photo-electric cells, said mask having a plurality of apertures in two rows, the first of said rows having apertures positioned apart by one-third their width, said second row being arranged below said first row but offset therefrom so that each aperture of the second row overlaps by one-third the width of the aperture in the first row, a pair of horizontal deflecting plates positioned symmetrically about the axis of the tube in the converging portion thereof, a pair of vertical deflecting plates positioned symmetrically about the axis of the tube, a trigger and pulse amplifier for receiving and amplifying voltage pulses to be measured and connected to said horizontal deflecting plates, said trigger amplifier also connected to said control electrode for turning on an electron beam when a voltage pulse is applied to said horizontal deflecting plates, high frequency generator connected to said vertical deflecting plates for deflecting said voltage pulses across the first and second rows of photoelectric cells, a plurality of amplifiers having their respective inputs connected to each of said photo-electric cells for amplifying a current change when the electron beam strikes said photo-electric cell, a plurality of coincidence amplifiers connected between overlapping photo-electric cell amplifiers for measuring said voltage pulse when said voltage pulse strikes the overlapping portions of said photo-electric cells in first and second row of photo-electric cells.

3. A pulse height amplitude analyzer for measuring various voltage amplitudes comprising a substantially conical evacuated glass tube, an electron gun having a cathode, filament, and control electrode positioned in a hollow cylindrical extension of the converging end of said cone, a plurality of detecting means positioned across the face of said tube in two rows, said detecting means positioned apart by one-third their width, a second row of detecting means arranged below the first row of detecting means but offset therefrom so that the detecting means of the second row overlap by one-third the width of the detecting means in said first row, a pair of horizontal deflecting plates positioned symmetrically about the axis of the tube in the converging portion thereof, a pair of vertical deflecting plates positioned symmetrically about the axis of the tube, a trigger and pulse amplifier for receiving and amplifying voltage pulses to be measured and connected to said horizontal deflecting plates, said trigger amplifier also connected to said control electrode for turning on an electron beam when the maximum of a voltage pulse is applied to said horizontal deflecting plates, high frequency generator connected to said vertical deflecting plates for deflecting said voltage pulses across the first and second rows of detecting means, a plurality of amplifiers having their respective inputs connected to each of said detecting means for amplifying a current change when the electron beam actuates said detector, a plurality of coincident amplifiers connected between overlapping detection means, amplifiers for measuring said voltage pulse when said electron beam activates the overlapping portion of said detecting means in the first and second row of detecting means.

No references cited.